US006558448B2

(12) United States Patent
Hu

(10) Patent No.: US 6,558,448 B2
(45) Date of Patent: May 6, 2003

(54) PHOTOBIOMOLECULAR METALLIC PARTICLES AND FILMS

(75) Inventor: Zhong-Cheng Hu, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/733,358

(22) Filed: Dec. 8, 2000

(65) Prior Publication Data

US 2001/0016236 A1 Aug. 23, 2001

Related U.S. Application Data

(62) Division of application No. 09/310,414, filed on May 12, 1999, now Pat. No. 6,162,278.

(51) Int. Cl.[7] .............................. B01J 23/42; B32B 5/16
(52) U.S. Cl. .............................. 75/252; 75/255; 75/362; 75/722; 502/339; 502/439
(58) Field of Search .......................... 429/402; 502/339, 502/439; 75/252, 255, 362, 722

(56) References Cited

U.S. PATENT DOCUMENTS

| | | | |
|---|---|---|---|
| 4,657,646 A | | 4/1987 | Greenbaum |
| 4,822,673 A | * | 4/1989 | Umemura .................. 428/328 |
| 5,512,882 A | * | 4/1996 | Stetter et al. ............... 340/632 |
| 5,721,189 A | * | 2/1998 | Zhang ........................ 502/339 |
| 6,121,191 A | * | 9/2000 | Komatsu et al. ........... 502/339 |

OTHER PUBLICATIONS

Boardman, "Subchloroplast fragments: Digitonin method," *Methods Enzymol*, 23:268–276, 1971.

Greenbaum, "Platinized chloroplasts: A novel photocatalytic material," *Science*, 230(4732):1373–1375, 1985.

Greenbaum, "Interfacial photoreactions at the photosynthetic membrane interface: An upper limit for the number of platinum atoms required to form a hydrogen–evolving platinum metal catalyst," *J. Phys. Chem.*, 92:4571–4574, 1988.

Greenbaum, "Biomolecular electronics: Observation of oriented photocurrents by entrapped platinized chloroplasts," *Bioelectrochemistry and Bioenergetics*, 21:171–177, 1989.

Greenbaum, "Vectorial photocurrents and photoconductivity in metalized chloroplasts," *J. Phys. Chem.*, 94:6151–6153, 1990.

Greenbaum, "Kinetic studies of interfacial photocurrents in platinized chloroplasts," *J. Phys. Chem.*, 96:514–516, 1992.

Greenbaum, "Photobioelectronic studies with thylakoid membranes," *Applied Biochemistry & Biotechnology*, 20(21):813–824, 1989.

Lee et al., "Photosynthetic water splitting: *In–situ* photoprecipitation of metallocatalysts for photoevolution of hydrogen and oxygen," *Energy & Fuels*, 8(3):770–773, 1994.

(List continued on next page.)

Primary Examiner—George Wyszomierski
(74) Attorney, Agent, or Firm—Akerman Senterfitt

(57) ABSTRACT

The method of the invention is based on the unique electron-carrying function of a photocatalytic unit such as the photosynthesis system I (PSI) reaction center of the protein-chlorophyll complex isolated from chloroplasts. The method employs a photo-biomolecular metal deposition technique for precisely controlled nucleation and growth of metallic clusters/particles, e.g., platinum, palladium, and their alloys, etc., as well as for thin-film formation above the surface of a solid substrate. The photochemically mediated technique offers numerous advantages over traditional deposition methods including quantitative atom deposition control, high energy efficiency, and mild operating condition requirements.

12 Claims, 3 Drawing Sheets

OTHER PUBLICATIONS

Lee et al., "Molecular electronics of a single photosystems I reaction center: Studies with scanning tunneling microscopy and spectroscopy," *Proc. Natl. Acad. Sci. USA*, 92:1965–1969, 1995.

Lee and Greenbaum, "Bioelectronics and biometallocatalysis for production of fuels and chemicals by photosynthetic water splitting," *Appl. Biochem. Biotechnol.*, 51(52):295–305, 1995.

Lee et al., "Platinization: A novel technique to anchor photosystem I reaction centres on a metal surface at biological temperature and pH," *Biosensors & Bioelectronics,*, 11(4):375–387, 1996.

Reeves and Hall, "Higher plant chloroplasts and grana: General preparative procedures (excluding high carbon dioxide fixation ability chloroplasts)," *Methods Enzymol.*, 69: 85–94, 1980.

Rutherford and Sétif, "Orientation of P700, the primary electron donor of photosystem I," *Biochimica et Biophysica Acta*, 1019:128–132, 1990.

Séif et al., "Contribution to the structural characterization of eukaryotic PSI reaction centre—II. Characterization of a highly purified photoactive SDS—CP1 complex," *Photosynth. Res.*, 1:17–27, 1980.

\* cited by examiner

PHOTOBIOMOLECULAR METALLIC PARTICLES AND FILMS

This is a divisional of application Ser. No. 09/310,414, now U.S. Pat. No. 6,162,278 filed May 12, 1999.

The U.S. Government has a paid-up license in this invention and the right in limited circumstances to require the patent owner to license others on reasonable terms as provided for by the terms of Grant No. S-90,842 awarded by the Department of Energy.

BACKGROUND OF THE INVENTION

This invention relates generally to metallic particles and films, and more particularly to methods for their production by linking the electron pumping features of certain biological systems, such as the photosynthetic machinery, with the reductive precipitation of metallic particles.

Photosynthesis is the biological process that converts electromagnetic energy into chemical energy through light and dark reactions. In green algae and higher plants, photosynthesis occurs in specialized organelles, called chloroplasts. The chloroplast is enclosed by a double membrane and contains thylakoids, consisting of stacked membrane disks (called grana) and unstacked membrane disks (called stroma). The thylakoid membrane contains two key photosynthetic components, photosystem I and photosystem II, designated PSI and PSII, respectively, as depicted schematically in FIG. 1. During photosynthesis, water is split into molecular oxygen, protons and electrons by PSII. Electrons derived from the splitting of water molecules are transported through a series of carriers to PSI where they are further energized by a light-induced photochemical charge separation and transported across the thylakoid membrane where they are used for the enzymatic reduction of $NADP^+$ to NADPH. This biological reaction is further utilized for chemical energy production, primarily in the form of ATP.

Ultrafine metallic particles, e.g., nanoparticles, are important precursors for use in the fabrication of advanced material structures, such as thin continuous films. Conventionally, metallic films have been deposited on substrates by methods such as chemical vapor deposition (CVD), sputtering, plating, and the like. Unfortunately, such methods do not generaly offer a degree of control desired for the deposition of nanostructured materials, e.g., films having nanometer range thicknesses or grains. Therefore, a method which could drive the nucleation, growth and deposition of nanoparticles in a quantitative, rapid, and energy-efficient manner would be highly desirable for many applications, including materials processing, catalysis, separations, electronics, energy production processes, and environmental applications.

Despite the extensive investigation concerning the photosynthetic machinery, the use of photosynthesis-related principles for materials synthesis and processing has not been described. The present invention, by exploiting the electron pumping characteristics of the photosynthetic machinery for nanoparticle production and processing applications, provides improved methods and materials which overcome or at least reduce the effects of one or more of the aforementioned problems.

SUMMARY OF THE INVENTION

This invention broadly concerns methods for the controlled deposition of ultrafine metallic particles and thin films via biomolecular electronic mechanisms. In particular, the invention takes advantage of the electron-pumping characteristics of photosynthesis system I (PSI), and other biological systems having similar features, for photocatalytically reducing metal precursor chemicals into metallic nanostructured materials.

Therefore, according to one aspect of the invention, a metallic film is formed by providing a liquid suspension which is at least partly comprised of a plurality of photosystem I-containing units, metal precursors, and any other component necessary or desired for effecting the photochemical reaction on the PSI-containing unit, e.g., electron donor molecules. The liquid suspension is contacted with light, preferably in the form of intermittent flashes, under conditions effective for causing the controlled reductive precipitation of the metal precursors on the photosystem I-containing units to form photosystem I-metal complexes. Generally, the liquid suspension containing the photosystem I-metal complexes is provided above the surface of a solid or semisolid substrate, such as a surface comprised of gold, silicon, silica, alumina, zirconia, titania, or any of a variety of other materials. Thereafter, the liquid of the liquid suspension is removed, for example by applying heat and/or vacuum to evaporate the liquid. Upon removal of the liquid, a film is thereby formed on the surface of the substrate that is at least partly comprised of the metal from the photosystem I-metal complexes.

In another aspect of the invention, a plurality of PSI-containing units may be anchored or otherwise coated on a desired substrate prior to performing the photo-induced formation of the photosystem I-metal complexes. This PSI-coated substrate is then contacted with a solution containing a plurality of metal precursors, electron donor molecules and other desired components. The solution and the underlying PSI-coated substrate are thereafter contacted with light energy under conditions effective for causing the reductive precipitation of the metal precursor on the photosystem I-containing unit to form photosystem I-metal complexes that are spatially constrained along the surface of the substrate. Under appropriate reaction conditions, the metal particles on the PSI-containing units are controllably grown to a size at which metal particles on adjacent PSI-containing units above the substrate merge into a continuous metallic film.

In another aspect of the invention, metallic nanoparticles are provided by forming PSI-metal complexes in a suitable liquid suspension and thereafter separating the metal particles from the PSI-metal complexes. The means by which the metal particles are separated may include any suitable chemical, physical or mechanical treatment sufficient to remove the particles from the complexes without adversely affecting their chemical composition or structural integrity.

The methods of the present invention offer numerous advantages over other technologies, e.g., CVD, sputtering, electroless plating, MBE, etc., for the production of metallic particles, films, and other materials such as alloys and composites. First the methods allow for precisely controlled metal particle nucleation and growth for atomic-level deposition. The methods are energy-efficient and have no requirement for high temperature or pressure/vacuum systems, such as are required for other technologies. Moreover, the methods offer controllable deposition kinetics which may be varied through modulation of the light energy input level. Finally, the methods are environmentally benign and noninterfering, i.e, light is the controlling mechanism.

The nanosized particles of this invention, and the products derived therefrom, will support a broad range of applications, including energetics (e.g., as fuel in propellants), explosives, microelectronics, catalysis, powder metallurgy, coating and joining technologies, and others. For example, for catalysis/separations applications, reductions in metallic film thicknesses will reduce metal cost, allow higher hydrogen flux, enhance permselectivity, and improve membrane reactor efficiency. The membrane reactors have been used in energy generation and environmental application processes, such as the advanced power generation and environmental application processes, such as the advanced power generation systems-integrated gasification combined cycle (IGCC) systems.

In the petrochemical industry, important applications may include hydrogen separation and membrane reactions concerning hydrocarbon (such as propane and ethylbenzene) dehydrogenation and natural gas steam reforming (e.g., $CH_4+H_2O \rightarrow CO+3H_2$), oxidative reforming of methane to syngas, and partial oxidation or oxidative coupling of methane into hydrogen and higher hydrocarbons. For these chemical reactions, palladium (Pd)-based membranes may be preferred in terms of temperature resistance and hydrogen permeability, however other metals, e.g., platinum and osmium, may also be used. In addition, metallic nanoparticle arrays of uniform particle size in the range of about 2.5–100 nm deposited over a large area oxide (1 cm$^2$) support offer promising alternatives to single crystal surface catalysts.

The methods of the invention also find use in a variety of applications involving electronic materials and devices, such as electronic circuit board fabrication, metallic (Pd) buffer layer preparation for superconducting RABiTS (Rolling-Assisted Biaxially Textured Substrate), and multilayer devices (such as hard disk reading head memory chip) based on GMR (Giant Magnetorresistance).

BRIEF DESCRIPTION OF THE DRAWINGS

The invention may be best understood by reference to the following description taken in conjunction with the accompanying drawings in which.

Figure 1:
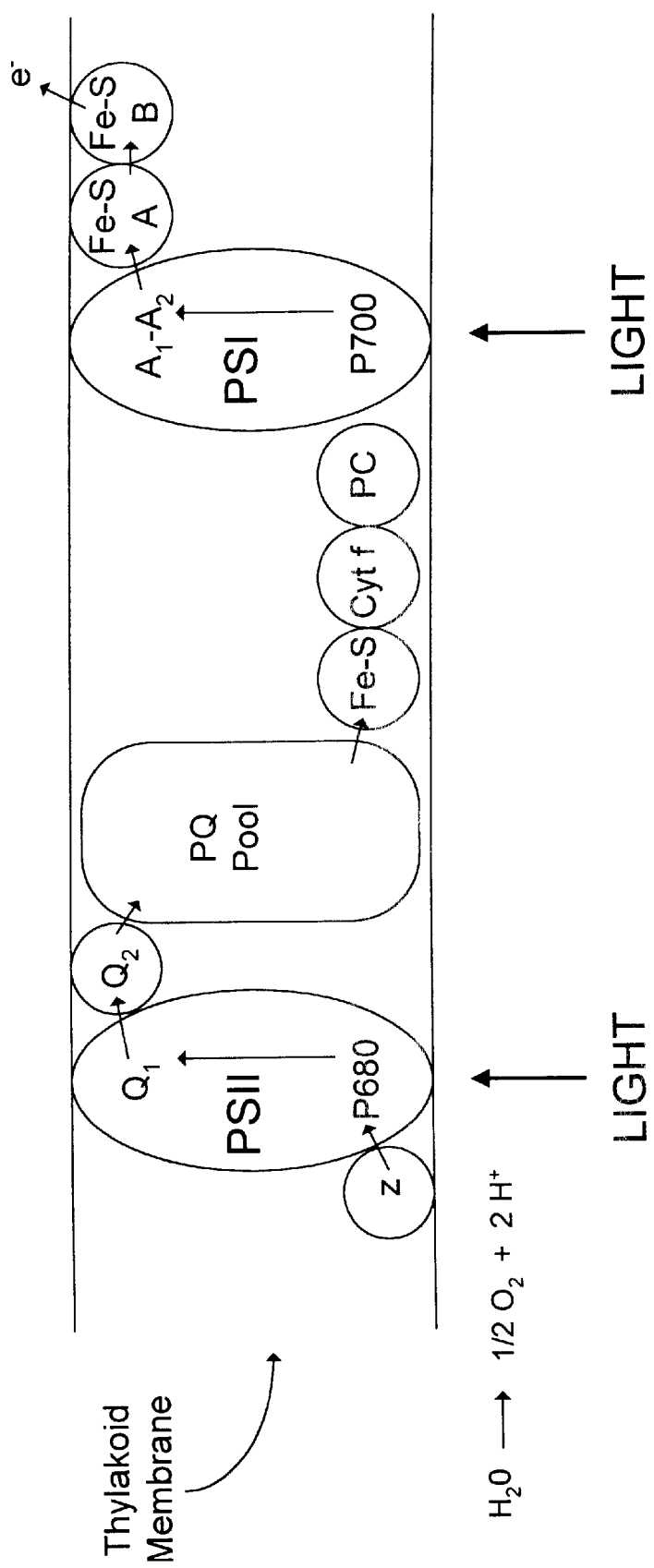
FIG. 1 depicts schematically a simplified representation of light-induced electron transport through the photosynthetic machinery of the thylakoid membrane.
Figure 2:
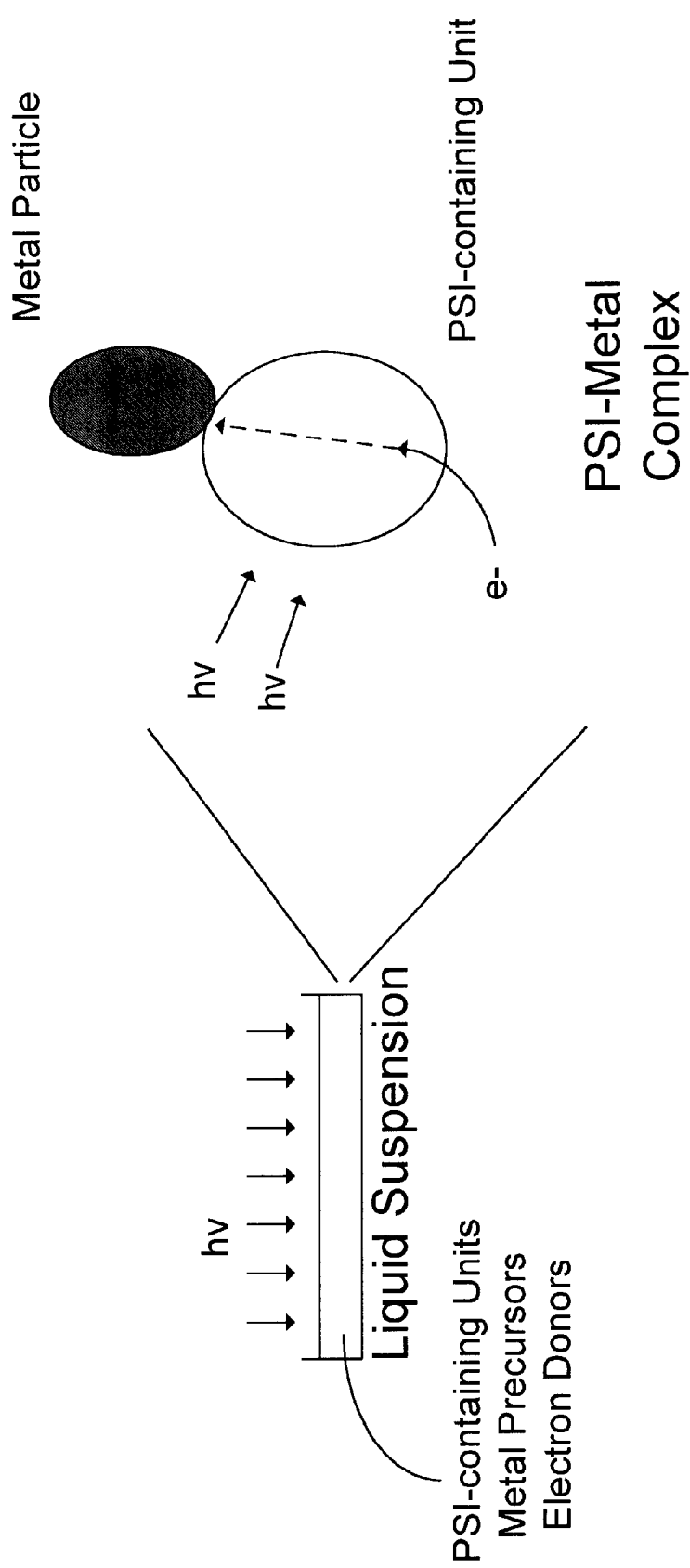
FIG. 2 illustrates the production of a light-induced PSI-metal complex in a liquid suspension which contains metal precursors, electron donors and PSI-containing units. The metal precursors in the suspension undergo reductive precipitation at the reducing end of PSI to form a metal particles, the sizes of which may be controlled by the amount of light provided.
Figure 3:
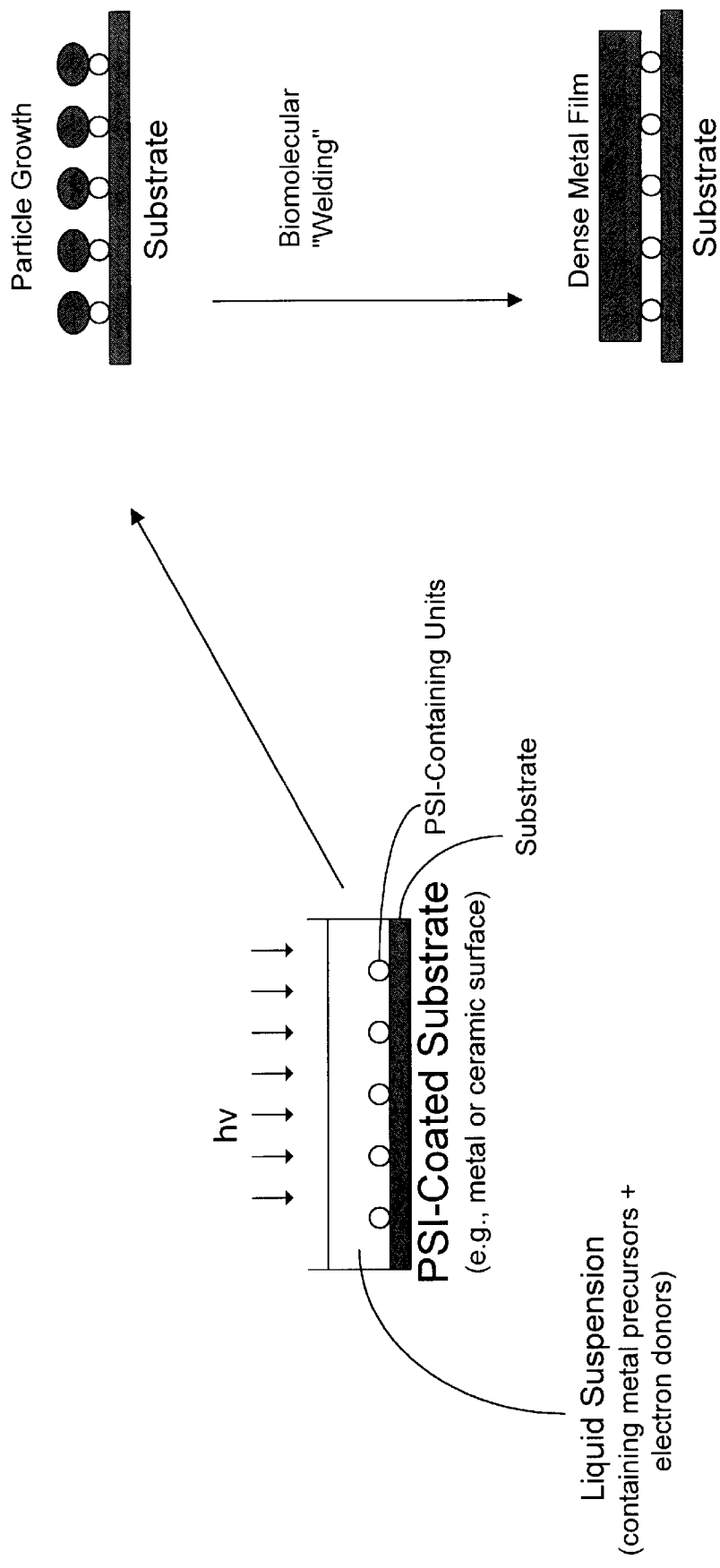
FIG. 3 illustrates one embodiment of the invention wherein PSI-containing units are coated/anchored on a suitable substrate. The PSI-coated substrate is contacted with a solution containing metal precursors and electron donor molecules, and light energy is applied under condition for forming the desired PSI-metal complexes. As the metal particles of the PSI-metal complexes grow larger in response to a continued application of light energy, the particles can merge by biomolecular "welding" to form a continuous metal film over the substrate.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

According to the present invention, metallic nanoparticles and films are produced by light-mediated reactions between the reducing end of a PSI-containing unit and metal precursor compounds. The reactions are generally carried out in a liquid suspension containing metal precursor compounds and electron donor molecules such that the photoelectrodeposition and nanoparticle growth is induced on the reducing end of PSI reaction centers by the controlled administration of light energy. For example, by using a pulsed light source, metal precipitation on the reducing end of PSI, and consequently the size of metal particles generated, can be controlled at the atomic level, e.g. by precise deposition of one metal atom at a time.

Metallic nanoparticles, or metallic particles, as the terms are used herein, refer to the those particles attainable by the methods of the invention. The size of the nanoparticles so produced are not strictly limited, and may range, for example, from less than 1 nm to greater than 1000 nm or more. However, certain advantages may be realized when the nanoparticles have diameters in the range of about 1 nm to 100 nm. Preferably, the nanoparticles will have diameters in the range of about 1 nm to 10 nm. The metallic nanoparticles may be separated from the PSI-containing units after they are produced or may be used while still coupled to the PSI-containing units, depending on the particular application.

The PSI-containing units used in accordance with the present invention will preferably be comprised of isolated thylakoids or PSI particles prepared, for example, from spinach chloroplasts. Methods for the isolation and preparation of thylakoids and PSI particles are well known in the art (see, for example, Boardman, 1971; Setif et al., 1980; Reeves and Hall, 1980). Of course other PSI-containing units or photoelectron pumping units may also be used. For example, the PSI-containing unit may be comprised of any of a variety of combinations of photosynthetic and/or other cellular or non-cellular components provided the PSI-containing unit contains the components necessary for effecting reductive precipitation of the desired metal precursor. The PSI-containing unit, as the phrase is used in the context of this invention, may include other electron pumping cellular machineries from plant or non-plant organisms. The skilled individual will appreciate that other biological photochromic units (such as PSII, bacterial light-sensitive proteins, bacteriorhodopsin, photocatalytic microorganisms, and algae) or a biotic photocatalytic unit such as $TiO_2$ and pigments (e.g., proflavine and rhodopsin), may be suitable since these systems also possess a mechanism for light-induced electron pumping. Moreover, one could also produce electron pumping systems using self-assembled-monolayers containing light sensitive organic dyes.

PSI is a protein-chlorophyll complex that is part of the photosynthetic machinery within the thylakoid membrane (see FIG. 1). It is ellipsoidal in shape and has dimensions of about 5 by 6 nanometers. The photosystem I reaction center/core antenna complex contains about 40 chlorophylls per photoactive reaction center pigment (P700). The chlorophyll molecules serve as antennae which absorb photons and transfer the photon energy to P700, where this energy is captured and utilized to drive photochemical reactions. In addition to the P700 and the antenna chlorophylls, the PSI complex contains a number of electron acceptors. An electron released from P700 is transferred to a terminal acceptor at the reducing end of PSI through intermediate acceptors, and the electron is transported across the thylakoid membrane.

Natural photosynthetic systems have been modified to contain colloidal metallic platinum at the reducing site of PSI in thylakoid membranes in order to make metallic catalyst systems (see, for example, Greenbaum, 1985; Greenbaum, 1988; Greenbaum, 1990; Lee et al., 1990; Lee et al., 1994). In these reactions, molecular hydrogen is synthesized through reduction of protons by a reaction that is catalyzed by the platinum colloidal particles adjacent to the reducing site of PSI on the stromal side of the thylakoid membrane. Platinization of PSI can be accomplished through either chemical precipitation (such as platinum precipitation by $H_2$ purging) or preferably by in-situ photochemical reduction of platinum chemical precursors into metallic platinum colloid. Both chemical and in-situ photogenic reductive precipitation of metal platinum occur in close proximity to the PSI reducing end, indicating that metal precursors (e.g., $[Pt(Cl)_6]^{2-}$) have high affinity for the PSI reducing end (Greenbaum 1988; Lee et al., 1994). It has been shown that the platinization process does not impede the intrinsic photosynthetic activity, e.g., electron transport (Greenbaum, 1990; Lee et al., 1995), and that the properties of PSI reaction centers are stable under relatively long-term storage (Lee et al., 1995). Importantly, because hydrogen is synthesized during the photoreductive precipitation reactions described herein, hydrogen evolution can be used as a sensitive indicator of metal particle formation on PSI (Greenbaum, 1988).

A film, as the term is used herein, refers to a film or coating at least partly comprised of and/or made from the nanoparticles described herein. Typically, the film will be supported by a solid substrate, such as those comprised of metal or ceramic, e.g., gold, silicon, silica, titania, zirconia, and the like. For most applications, the films will have a thickness in the range of about 1 nm to 5000 nm. Because of the high degree of control offered by this invention, high quality films in the range of about 1 nm to 100 nm are preferably produced. The metallic films produced according to the invention may be formed as composites or alloys with other materials. Additionally, they may contain residual proteinaceous material as a result of the presence of PSI-containing units present during some film forming processes In one embodiment of the present invention, a method is provided for producing films from metallic nanoparticles using liquid suspensions comprised of photosystem I-containing units, metal precursor compounds and electron donor compounds. Additional components may also be present in the liquid suspension, for example, organic monomers, depending on the requirements and/or preferences of a given application. The liquid suspension is contacted with light under conditions in which the metal precursor undergoes reductive precipitation at the reducing end of the PSI particle of the PSI-containing unit. As a result, metallic particles are provided in the form of photosystem I-metal complexes in the liquid suspension. The size of the metallic particles in the PSI-metal complexes is directly related to amount and intensity of light energy administered. Consequently, particles having desired dimensions may be controllably synthesized.

The PSI-metal complexes are provided above a solid substrate, typically by applying a volume of the suspension on the surface of the substrate. The substrate may be one upon which the liquid suspension was previously applied prior to formation of the PSI-metal complexes. Alternatively, the PSI-metal complexes may be formed in a separate liquid suspension vessel and the liquid suspension may be thereafter applied above the substrate surface. In one preferred approach, sol/gel techniques are used wherein the substrate is dipped directly into the liquid suspension containing the PSI-metal complexes or the liquid suspension containing the PSI-metal complexes is spin coated onto the substrate. Such methods may be preferred where a high degree of thickness control is desired. Substantially all of the liquid present in the liquid suspension is removed from the coated substrate, for example by air drying or by applying heat, vacuum, etc., to cause evaporation of the liquid. This provides on the surface of the substrate a film comprised primarily of PSI-metal complexes.

Films having a variety of structural features may be obtained by this approach. For example, microporous films may be produced by coating the substrate with a liquid suspension comprised of a mixture of PSI-metal complexes wherein the PSI-containing units are thylakoids. Alternatively, nanoporous films may be provided by using liquid suspension containing PSI-metal complexes wherein the PSI-containing units are isolated PSI particles. Thus, the size of the biological components present in the PSI-metal complexes will determine to some extent the size of the pores in the materials following removal of the biological components from the films, e.g., by sintering. In addition, dense nanophase films can be provided by coating on the substrate a solution containing substantially pure metallic nanoparticles which have been separated from the PSI-metal complexes.

According to another embodiment of the invention, metallic film fabrication can be achieved on an ordered layer of PSI-containing units anchored or otherwise coated on the surface of a substrate (such as gold, silicon, alumina, etc.). These PSI-coated substrates have been described (see, for example, Rutherford and Sétif, 1990; Lee et al., 1996; and Lee et al., 1995). The types of interactions (e.g., covalent, electrostatic, etc.) between the PSI-containing units and the substrate are not critical provided they are substantially stable in the liquid suspensions in which the photoreactions will be performed and they do not preclude the availability of the reducing end of the PSI unit for reductive metal precipitation.

The PSI-coated substrate is contacted with a solution (or, alternatively, could be exposed to vapor) that contains the desired metal precursor compounds and electron donor molecules. Light exposure of the PSI-containing units on the substrate leads to the reductive precipitation of the metal, as described above. However, in this embodiment, metal particle formation is spatially constrained along the surface of the substrate where the PSI-containing units are anchored. By controlling the input of light energy and the number of light pulses, and therefore particle growth, a biomolecular "welding" effect may be achieved on the PSI-coated layer, in which adjacent metallic particles precipitated on the PSI-containing units grow sufficiently large and eventually coalesce into a continuous metal film. The size of metal particles and the thickness of the film that is formed can therefore be precisely controlled by exposing an appropriate amount of light energy on the photoreactor system. Of course, the light input required to form a film having a desired thickness will depend to some extent on the density of the PSI-containing units coated on the substrate prior to light-induced metal precipitation.

Although thick films may be produced according to these methods, thin films having nanometer range thicknesses, e.g., 1 to 10 nm, are preferably synthesized to take advantage of the precise deposition control offered by this invention. None of the traditional film-forming technology, such as CVD, PVD, sputtering, or epitaxial growth can provide a comparable level of control. Moreover, the films of this invention can be advantageously provided as patterned metal layers using conventional photolithographic techniques.

In another embodiment of the invention, a method is provided for the production of metallic nanoparticles. In this approach, desired PSI-metal complexes are formed as described in the above embodiments. However, the PSI-metal complexes are not applied to a substrate to effect film formation. Rather, after the light induced reductive precipitation reactions, the PSI-metal complexes are treated in a manner which allows for the separation of metallic particles from the PSI-containing units. This can be accoplished by any of a number of approaches. For example, the PSI-metal complexes could be treated with various surfactants, e.g., sodium dodecyl sulfate (SDS), or could be subjected to sufficent agitation, ultrasonication, etc., in order to disrupt the association between the metal particles and the PSI-units. Alternatively, the biological components present in the PSI-metal complexes could be solubilized with an organic solvent or degraded using enzymatic reactions, e.g., using nucleases, proteases, etc, to remove the metal particles provided the treatment does not unacceptably compromise the integrity of the particles. Upon dissociation of the metal particles from the PSI-units using an approach such as those described above, the metal particles can be readily separated by one or more density-based separation techniques.

The metal precursor compounds used in conjunction with this invention can include any of a variety of compounds capable of undergoing reductive precipitation to form a desired metallic species. The metal precursors will typically comprise ionic metal salts capable of accepting electrons from PSI such that upon transfer of one or more electrons, the metal precursors are reduced to a pure metal form. Suitable metal precursors for producing the metallic particles of the invention may include, without limitation, ionic salts of platinum, palladium, osmium, ruthenium, iridium, silver, copper, indium, nickel, iron and tin, such as chloride-derived, sulfate-derived and nitrate-derived salts of these and related metals. Particularly preferred metal precusors for use in the invention include hexachloroplatinate ($[PtCl_6]^{2-}$), hexachloroosmiate ($[OsCl_6]^{2-}$), and hexachloropalladinate ($[PdCl_6]^{2-}$).

The electron donor molecules which are included in the liquid suspensions according to the invention should of course be compatible with the PSI electron pumping system that is employed. The electron donor in most applications will be water, however some organic molecules may be present in the liquid suspensions which serve as facilitators of the electron transport process. These may include, for example, EDTA, proflavin, methylviologen, and the like. The concentration of these facilitator molecules, when present, will typically be in the range of about 10 mM to 100 mM in the liquid suspension.

Essentially any light source may be used in accordance with the invention provided it can generate light in a visible portion of the solar emission spectrum. Typically, the wavelengths of light most effective for causing PSI electron pumping activity will be between about 400 and 700 nm. Although the light exposure of the PSI-containing units may be continuous, it will generally be preferred to use intermittent pulses/flashes of light given the level of control this provides over particle growth. Intermittent illumination with a pulsed flash light source (e.g., a stroboscopic flash lamp) can provide quantitative control of the deposition at the reducing sites of PSI, one metallic atom at a time. Numerous such light sources are available, such as the GenRad Model 1539A xenon flash lamp. Preferably, the flash lamps are coupled with a trigger generator, such as the Hewlett Packard Model 8011A. This device allows the frequency of the trigger pulses to be varied from 1 to 400 Hz, the range of frequencies over which the xenon flash lamps may be fired without degrading light output.

In addition to the nanoparticles and continuous thin films described above, metallic patterns of nanoscale resolution may be prepared on a substrate surface by coupling laser and/or electron beam lithography techniques with the methods of this invention. For example, a position-controllable laser beam could be used to provide precise deposition of metal particles and/or lines in essentially any desired pattern on the surface of a PSI-coated substrate.

If the substrate on which the deposition is performed is a ceramic, the invention can be readily adapted for the fabrication of various types of metal-ceramic membranes, e.g., (1) dense or porous metallic membranes that are supported on porous ceramic membranes; (2) metals deposited inside the pores of ceramic membranes; and (3) metals coated on solid particles that are partially sintered onto inorganic membranes.

The following example is provided to illustrate one embodiment of this invention. The techniques disclosed in the example which follows represent those projected by the inventors to function in the practice of the invention and thus can be considered to constitute an example of one mode for its practice. However, those skilled in the art should, in light of the present disclosure, appreciate that many changes can be made in the specific embodiments which are disclosed and still obtain a like or similar result without departing from the spirit and scope of the invention.

EXAMPLES

Photobiomolecular Deposition of a Platinum Film

Type C chloroplasts are isolated according to the method of Reeves and Hall (1980). In this preparation, the chloroplast envelope is osmotically ruptured, exposing the thylakoid membranes to the external aqueous medium. The thylakoids are suspended in Walkers assay medium and adjusted to a final chlorophyll concentration of about 3 mg. A solution of chloroplatinic acid neutralized to pH 7 is added in the dark to the thylakoid suspension to give a final concentration of 1 mM in the suspension (this value is not critical provided there is an excess of hexachloroplatinate ions to photosystem I reaction centers). The liquid suspension is illuminated with a xenon stroboscopic light source (GenRad Type 1539) set to be triggered by a pulse generator (Hewlett-Packard 8011A). The frequency of the flashing is 10 Hz and the duration is 3 μsec at half height. Pulsed light exposure of the suspension is performed for 90 minutes. Following the light treatment of the suspension to form the desired PSI-metal complexes, the suspension is spin coated on a silicon substrate at about 25° C. to provide the desired film. The PSI-film so produced will exhibit photocatalytic properties and vectorial electron transport, and will be useful, for example, as a photocatalyst.

The particular embodiments disclosed above are illustrative only, as the invention may be modified and practiced in different but equivalent manners apparent to those skilled in the art having the benefit of the teachings herein. More specifically, it will be apparent that certain compounds that are chemically, structurally and/or functionally related to those disclosed herein may be substituted in the methods of this invention while the same or similar results would be achieved. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

REFERENCES

Boardman, *Methods Enzymol*, 23:268, 1971.
Greenbaum, "Platinized chloroplasts: a novel photocatalytic material," *Science*, 230(4732):1373, 1985.
Greenbaum, "Interfacial photoreactions at the photosynthetic membrane interface: an upper limit for the number of platinum atoms required to form a hydrogen-evolving platinum metal catalyst," *J. Phys. Chem.*, 92:4571, 1988.
Greenbaum, "Biomolecular electronics: observation of oriented photocurrents by entrapped platinized chloroplasts," *Bioelectrochemistry and Bioenergetics*, 21:171, 1989.
Greenbaum, "Vectorial photocurrents and photoconductivity in metalized chloroplasts," *J. Phys. Chem.*, 94:6151, 1990.
Greenbaum, "Kinetic studies of interfacial photocurrents in platinized chloroplasts," *J. Phys. Chem.*, 96:514, 1992.
Lee, Tevault, Blankinship, Collins, Greenbaum, "Photosynthetic water splitting: in-situ photoprecipitation of metallocatalysts for photoevolution of hydrogen and oxygen," *Energy & Fuels*, 8:770, 1994.
Lee, Lee, Warmack, Allison, Greenbaum, "Molecular electronics of a single photosystems I reaction center: studies with scanning tunneling microscopy and spectroscopy," *Proc. Natl. Acad. Sci. USA*, 92:1965, 1995.
Lee and Greenbaum, "Bioelectronics and biometallocatalysis for production of fuels and chemicals by photosynthetic water splitting," *Appl. Biochem. Biotechnol.*, 51(52):295, 1995.
Lee, Lee, Greenbaum, "Platinization: a novel technique to anchor photosystem I reaction centers on a metal surface at biological temperature and pH," *Biosensors & Bioelectronics,*, 11(4):375, 1996.
Reeves, S. G.; Hall, D. O., *Methods Enzymol.* 69: 85–94, 1980.
Rutherford and Setif, "Orientation of P700, the primary electron donor of photosystem I," *Biochimica et Biophysica Acta*, 1019:128, 1990.
Sétif, Acker, Lagoutte, Duranton, *Photosynth. Res.*, 1:17, 1980.

What is claimed:

1. A metal nanoparticulate deposit produced by the steps of:
    preparing a sample comprising an electron donor, protein-chlorophyll photosystem I (PSI) units and a metal precursor reducible by said PSI units, said PSI units disposed in an ordered array on a substrate;
    inducing single or multiple electron emission from the PSI units under conditions that reduce one or more atoms of the metal precursor to form a plurality of PSI/metal complexes, said complexes each including a PSI-containing unit bound to a metal nanoparticle; wherein
    said plurality of complexes form an ordered array on said substrate, each of said metal nanoparticles ordered around said PSI units.

2. The metal nanoparticulate deposit of claim 1 wherein the PSI units of the complex are removed to provide a polycrystalline nanoporous film, said polycrystalline nanoporous film comprising a plurality of metal nanoparticles.

3. The metal nanoparticulate deposit of claim 1 wherein said metal nanoparticles have sizes from about 1 nm to about 100 nm in diameter.

4. The metal nanoparticulate deposit of claim 1 wherein said metal nanoparticles have sizes from about 1 nm to about 10 nm in diameter.

5. The metal nanopartioulate deposit of claim 1 wherein said nanapartioles comprise a plurality of metal atoms, said nanoparticles being within a predetermined size range, said size range varying by no more than a size of said metal atoms.

6. The metal nanoparticulate deposit of claim 1 wherein said ordered array of complexes form a nanoporous film, said nanoporous film having a thickness of from about 1 nm to about 100 nm thick.

7. The metal nanoparticulate deposit of claim 1 wherein the substrate is at least one selected from the group consisting of gold, silica, alumina, zirconia, titania, silicon, glass and plastic.

8. The metal nanoparticulate deposit of claim 7 wherein the substrate is silicon.

9. The metal nanoparticulate deposit of claim 1 wherein the metal is at least one selected from the group consisting of platinum, osmium and palladium.

10. The metal nanoparticulate deposit of claim 1 wherein the metal is platinum.

11. A metal containing assembly disposed an a substrate, comprising:
    a plurality of metal nanoparticles, said nanoparticles comprising a plurality of metal atoms, said nanoparticles being within a predetermined size range, said size range varying by no more than a size of said metal atoms.

12. The assembly of claim 11, wherein said metal nanoparticles are disposed in an ordered array on said substrate, each of said metal nanoparticles ordered around a point of origin.

* * * * *